Figure 1:
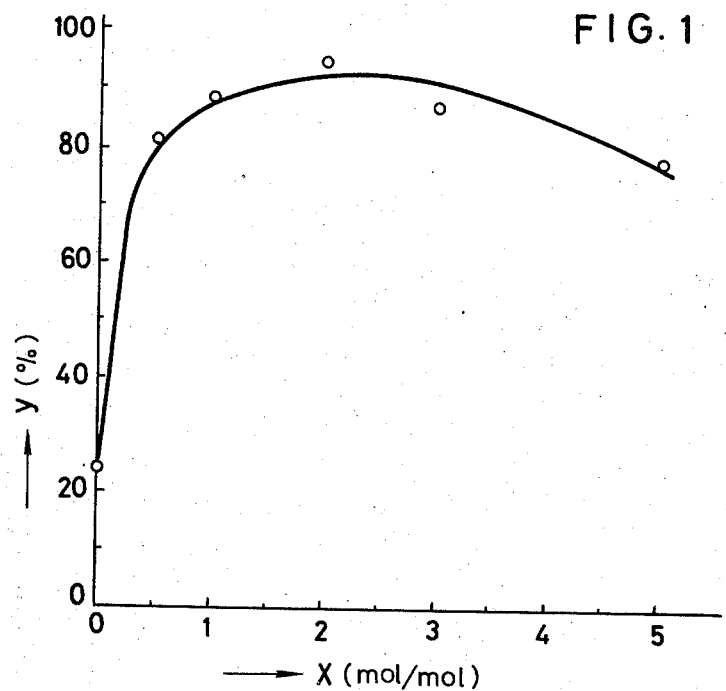

United States Patent [19]

Imai et al.

[11] 3,721,716

[45] March 20, 1973

[54] PROCESS FOR THE PREPARATION OF 5-ALKYLIDE NENORBORNENE-2

[75] Inventors: Hirosuke Imai, Yokohami; Mitsuo Matsuno, Kawasaki, both of Japan

[73] Assignee: Nippon Oil Company Limited, Tokyo, Japan

[22] Filed: Sept. 29, 1971

[21] Appl. No.: 184,708

[30] Foreign Application Priority Data

Oct. 5, 1970 Japan.................................45/86909

[52] U.S. Cl...............................................260/666 PY
[51] Int. Cl................................................C07c 5/24
[58] Field of Search................................260/666 PY

[56] References Cited

UNITED STATES PATENTS 3,347,944 10/1967 Fritz et al. .......................260/666 PY
3,591,647 7/1971 Kochi et al. ....................260/666 PY

*Primary Examiner*—Delbert E. Gantz
*Assistant Examiner*—Veronica O'Keefe
*Attorney*—Buckman & Archer

[57] ABSTRACT

A process is disclosed for the preparation of 5-alkylidenenorbornene-2 for use as an important component of EPDM rubber. This product is obtained by the isomerization of 5-alkenylnorbornene-2 which is accelerated by the catalytic action of certain complexes. These complexes are formed by combining organic alkalimetal compounds with alkylene diamines.

8 Claims, 2 Drawing Figures

INVENTORS
HIROSUKE IMAI
MITSUO MATSUNO

PROCESS FOR THE PREPARATION OF 5-ALKYLIDENENORBORNENE-2

This invention relates to a process for the preparation of 5-alkylidenenorbornene-2, and more specifically to a process for preparing 5-alkylidene-norbornene-2 by rearranging 5-alkenylnorbornene-2.

Recently, a copolymer of ethylene, propylene and non-conjugated diolefins commonly known as EPDM has invited keen attention in the art for its excellent weather-proofing, ozone-resistant and heat-resistant properties. However, the EPDM polymers have the drawback that their vulcanization rate is inferior to that of widely used rubbers such as natural rubber, SBR and polybutadiene rubber. Moreover, EPDM is difficult to covulcanize with these rubbers. It has been later found that the problems of vulcanization inherent in the EPDM copolymers can be solved to a satisfactory extent by employing, as the non-conjugated diolefin, certain 5-alkylidenenorbornene-2 such as for example 5-ethylidenenorbornene-2 in the preparation of the EPDM copolymers.

Heretofore, various processes have been introduced for the preparation of 5-alkylidenenorbornene-2, but there were no definite processes established for producing this material economically on a commercial scale at least to an extent to make the EPDM process economically feasible.

Known processes for preparing 5-alkylidenenorbornene-2 as the third component of EPDM copolymers include:

i. The Diels-Alder reaction of alkylallene with cyclopentadiene.

ii. The isomerization of 1-alkylnorboradiene-2,5 produced by the Diels-Alder reaction of acetylene with alkylcyclopentadiene.

iii. The isomerization of 5-alkenylnorbornene-2 produced by the Diels-Alder reaction of diolefin with cyclopentadiene.

The processes i) and ii) are disadvantageous in that the materials, viz. alkylallene and alkylcyclopentadiene, are relatively expensive. The process iii) involves difficulties in carrying out the isomerization reaction.

Various processes are known for isomerizing 5-alkenylnorbornene-2. Typical examples are disclosed for example by U.S. Pat. No. 3,347,944 wherein the reaction is carried out in the presence of certain alkalimetal/carrier catalysts and also wherein the reaction employs strong bases such as t-butoxy potassium and potassium hydroxide in dimethyl sulfoxide; by French Pat. 1,529,455 wherein the reaction takes place in the presence of sodium/potassium alloy catalysts with hexamethyl phosporamide; by French Pat. 1,534,366 wherein the reaction is conducted with sodium amide dissolved in nitrogen-containing solvents such as ethylene diamine; and French Pat. 1,525,727 wherein the reaction is carried out in the presence of organic alkali metal catalysts such as a reaction product of o-chlorotoluene and sodium.

The above-exemplified prior-art isomerization processes involve a number of problems; namely, a) the catalyst activity is poor and hence, considerable amounts of catalysts are required to achieve a reasonable yield of 5-alkylidenenorbornene-2, b) the isomerization rate is slow, entailing a side-production of tetrahydroindene, c) the starting materials need to be highly pure, otherwise deactivation of the catalysts is invited, and d) large quantities of expensive solvents are required. These problems have made it difficult to produce with reasonable economy the desired 5-alkylidenenorbornene-2 by rearranging 5-alkenylnorbornene-2.

Whereas, it is an object of the present invention to provide a process for the preparation of 5-alkylidenenorbornene-2 which will eliminate the above-noted difficulties of the prior-art processes.

A more specific object of the invention is the provision of an improved process wherein 5-alkenyl-norbornene-2 is isomerized to 5-alkylidenenorbornene-2 with use of a minimum of catalysts, at increased reaction rate and without entailing a side-production of objectionable materials such as tetrahydroindene and polymers.

Another specific object of the invention is to provide an improved process wherein the isomerization reaction can be carried out without use of any solvent, or if desired with use of less expensive ordinary hydrocarbon solvents.

Other features and advantages of the invention will be apparent from the detailed description given hereinafter.

The term 5-alkenylnorbornene-2 used herein represents a compound having the general formula;

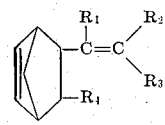

where $R_1$, $R_2$, $R_3$ and $R_4$ are hydrogen, methyl or ethyl radical, typical examples of which are 5-vinylnorbornene-2, 5-isopropenylnorbornene-2, 5-vinyl-6-methylnorbornene-2 and the like.

The reaction of isomerizing 5-alkenylnorbornene-2 to 5-alkylidenenorbornene-2 may be represented by the following formula:

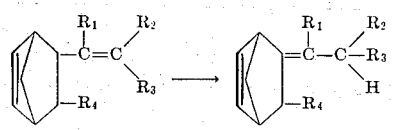

5-alkylidenenorbornene-2 exists in cis and trans isomeric forms but there is no appreciable difference therebetween when it is used as the third component in the production of EPDM rubber.

The catalyst employed in the process of the invention is a combination of an organic alkalimetal compound and a complexing agent.

The organic alkalimetal compound is represented by the general formula:

R—Me where Me is lithium, sodium or potassium, and R is an alkyl group such as methyl, ethyl, propyl, butyl, pentyl and so on, an alkenyl group such as allyl and methallyl, a cycloalkyl group such as cyclohexyl, an aryl group such as phenyl, or an arylalkyl group such as benzyl. The term organic alkalimetal compound used herein also includes a complex (charge transfer complex) of a polynuclear aromatic compound and lithium, sodium or potassium. Two or more of these mixtures may also be used. These organic alkalimetal compounds may be prepared within the isomerization reaction system, that is, in the presence of 5-alkenylnorbornene-2, or separately without the system.

The complexing agent to be combined with the above organic alkalimetal compounds according to the invention is an alkylene diamine derivative having either of the three structural formulas:

(a) 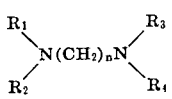

where $n$ is an integer of two or greater numbers, and $R_1$, $R_2$, $R_3$ and $R_4$ are an alkyl, cycloalkyl or aryl group exemplified by tetra-substituted polymethylene diamines including tetramethylethylene diamine, tetraethylethylene diamine, tetramethylpropylene diamine, and dimethylpiperazine.

(b) 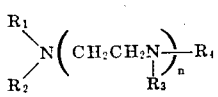

where $n$ is two or greater integer, and $R_1$, $R_2$, $R_3$ and $R_4$ are an alkyl, cycloalkyl or aryl group exemplified by substituted polyethylene polyamine such as pentamethyl diethylene triamine.

(c) 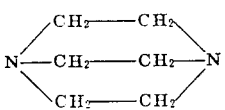

It has been found that the organic alkalimetal compounds when acted upon by the above exemplified complexing agents, tend to change prominently in color and become soluble in hydrocarbons in which the compounds would otherwise be insoluble. This is evidence of the formation of a complex. This complex is very active as a catalyst for the isomerization of 5-alkenylnorbornene-2. And as the same time, it acts to inhibit the tendency of side-production of tetrahydroindene derivatives as well as the occurrence of polymerization.

The amount of the complexing agent to be combined with the organic alkalimetal compound may be 0.1 to 5 mol equivalent, of the latter. Preferably this is in the range of 0.5 to 2 mol equivalent to achieve sufficient catalytic efficacy in the isomerization reaction according to the invention. Less complexing agent tends to suppress the formation of a complex having a rearranging activity. Conversely, excessive amounts of the agent are economically disadvantageous and may invite decreased catalytic activity.

The amount of the organic alkalimetal compound is not particularly critical but may be in the range of 0.1 to 100 millimols per mol of 5-alkenylnorbornene-2, preferably 0.5 to 50 millimols.

The isomerization of 5-alkenylnorbornene-2 according to the invention may be conducted in the absence of solvents. However, it is also possible to carry out the isomerization with use of certain solvents such as for example aliphatic or aromatic hydrocarbon which will not deleteriously affect the reaction. Advantageously, the process of the invention does not require expensive solvents such as dimethylsulfoxide, hexamethylphosphor amide and the like.

The isomerization process of the invention may be carried out at temperatures between 0° and 200° C, preferably between 30° and 190° C, and with or without pressure. It may be continuous or by batch.

Unreacted 5-alkenylnorbornene-2 may be separated by distillation from 5-alkylidenenorbornene-2 and used again for the isomerization.

The process of the invention will be further described by the following examples which are presented by way of illustration and not of limitation.

EXAMPLES I – V

These examples are given in respect of the rearrangement of vinylnorbornene using different quantities of tetramethylethylene diamine as combined with benzyl sodium.

Into a nitrogen-purged 100 milliliter stainless-steel autoclave were charged 0.2 mol 5-vinylnorbornene-2, 12 milliliters toluene solution having 2 millimol benzyl sodium dissolved therein, tetramethylethylene diamine in different quantities (shown in Table 1) and 2.7 milliliters t-butylbenzene as the standard substance for gas chromatography. The reaction was continued for one hour at 150° C with stirring. The reaction liquid was analyzed by gas chromatography to give the following data.

TABLE 1

| | Tetramethyl ethylene diamine (millimols) | Unreacted 5-vinyl norbornene-2 (percent) | Reaction product ENB* (percent) | Reaction product THI** (percent) | Remarks |
|---|---|---|---|---|---|
| Comparative Example 1. | 0 | 68.1 | 23.6 | 2.4 | Reaction system dark green and not homogeneous. |
| Example 1 | 1 | 17.5 | 80.8 | 0.3 | Brownish, not perfectly homogeneous solution. |
| Example 2 | 2 | 11.7 | 88.3 | Traces | Reaction system brownish, apparently homogeneous. |
| Example 3 | 4 | 5.7 | 94.3 | Traces | |
| Example 4 | 6 | 12.3 | 87.7 | Traces | |
| Example 5 | 10 | 21.7 | 78.3 | Traces | |

*ENB denotes 5-ethylidenenorbornene-2.
**THI denotes tetrahydroindene.

The data given in Table 1 above are further graphically illustrated by FIG. 1 of the accompanying drawing wherein the yield of 5-ethylidenenorbornene-2 (ordinate Y) is plotted against the addition of tetramethylethylene diamine/benzyl sodium catalyst (abscissa X).

The data thus obtained are evidence in support of the fact that benzyl sodium and tetramethylethylene diamine, when combined, form a complex of the character which exhibits extremely high catalytic activity in the isomerization reaction of 5-vinylnorbornene-2. It has also been ascertained that the combination sodium-and-diamine catalyst acts to suppress the tendency of tetrahydroindene being by-produced in the isomerization of 5-vinylnorbornene-2.

The benzyl sodium used in these examples was prepared by the transmetalation with toluene of phenyl sodium resulting from the reaction of chlorobenzene and sodium.

EXAMPLES VI–VII

These two examples are directed to the use of a combined catalyst of phenyl sodium and tetramethylethylene diamine in the rearrangement reaction of vinylnorbornene.

Figure 2:
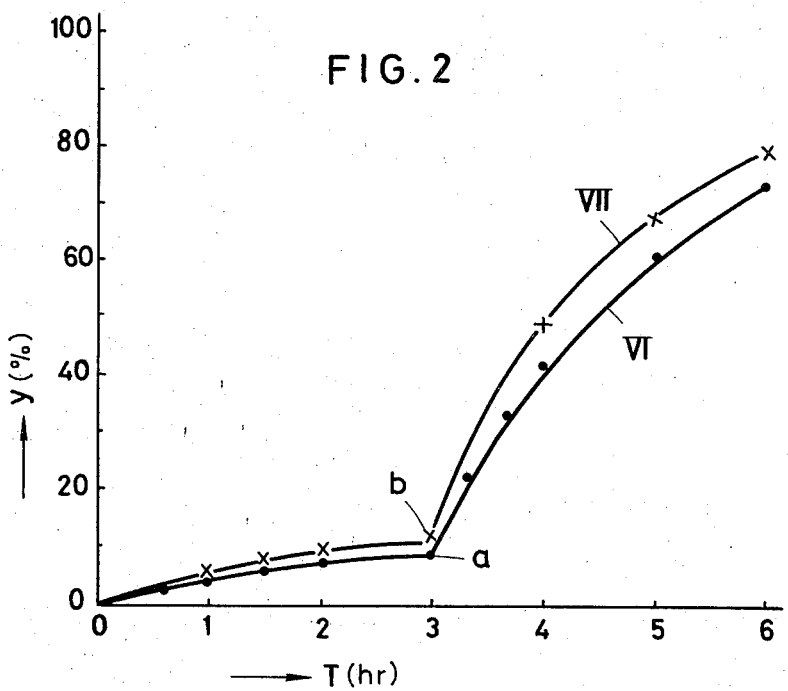

Into a nitrogen-purged 200 milliliter four neck flask were charged 0.4 mol 5-vinylnorbornene-2 and 8 millimols phenyl sodium prepared by reacting chlorobenzene with a sodium dispersion in benzene (20 milliliters). The reaction was continued at 50° C for 3 hours, followed by addition of tetramethyl-ethylene diamine. The amount of this diamine in the first instance was 8 millimols (refer to point a in FIG. 2), and that in the second instance was 16 milli-mols (refer to point b is FIG. 2). With addition of the diamine, the reaction was further continued for another three hours at 50° C. The reaction products were analyzed by gas chromatography using t-butylbenzene as the standard substance. The isomerization reaction changed with time as graphically shown in FIG. 2, wherein the yield of 5-ethylidenenorbornene-2 (ordinate Y) is plotted against the reaction time (abscissa T). The curve VI in the graph represents the case (Example VI) wherein 8 millimols tetramethylethylene diamine was added to the system while the reaction was in progress. The curve VII represents the case (Example VII) wherein the amount of tetramethylethylene diamine was 16 millimols. As apparent from FIG. 2, the isomerization reaction is extremely slow with phenyl sodium alone, but it will increase notably when tetramethylethylene diamine is added to the system.

COMPARATIVE EXAMPLES II–V

These examples are given in respect of the isomerization of 5-vinylnorbornene-2 employing triethylamine, diethylamine, pyridine and ethylenediamine respectively as combined with benzyl sodium.

Into a nitrogen-purged stainless-steel autoclave were charged 0.2 mol 5-vinylnorbornene-2 and 2 millimol benzyl sodium prepared by the exchange reaction of phenyl sodium with 12 milliliters toluene. There were also added 2 millimols of each of the various amines. The reaction was continued for one hour at 150° C, and the resulting product was analyzed by gas chromatography to obtain the following data in Table 2.

TABLE 2

| Compa-rative | Additive (millimols) | | Unreacted 5-vinyl-norbornene-2 | Reaction product | |
|---|---|---|---|---|---|
| | | | | ENB* (%) | THI** (%) |
| 1 | none | 0 | 68.1 | 23.6 | 2.4 |
| 2 | triethylamine | 2 | 70.4 | 26.1 | 0.5 |
| 3 | diethylamine | 2 | 90.3 | 5.7 | 1.4 |
| 4 | pyridine | 2 | 98.9 | 0 | 0.2 |
| 5 | ethylene diamine | 2 | 70.1 | 3.0 | 26.5 |

* ENB denotes 5-ethylidenenorbornene-2
** THI denotes tetrahydroindene

It will be noted that monofunctional amines such as triethylamine, diethylamine and pyridine, and bifunctional amines having an active hydrogen such as ethylene diamine are not capable of forming a complex with benzyl sodium and hence do not contribute to the isomerization of 5-vinylnorbornene-2.

EXAMPLES VIII — XI

These examples follow Example II except that various complexing agents are used in lieu of tetramethylethylene diamine as shown in Table 3 below.

TABLE 3

| | Complexing agent | Unreacted 5-vinyl-norbornene-2 (percent) | Reaction product | |
|---|---|---|---|---|
| | | | ENB* (percent) | THI** (percent) |
| Comparative Example I. | None | 0 | 68.1 | 23.6 | 2.4 |
| Example VIII | $C_2H_5$ \ / $C_2H_5$  N$C_2H_4$N  $C_2H_5$ / \ $C_2H_5$ | 2 | 10.4 | 89.6 | Traces |
| Example IX | $CH_3$ \ / $CH_3$  N$C_3H_6$N  $CH_3$ / \ $CH_3$ | 2 | 15.5 | 84.5 | Traces |
| Example X | $CH_3$ \ / $CH_3$  N$C_2H_4$N—$C_2H_4$N  $CH_3$ / | $CH_3$ \ $CH_3$ | 2 | 6.3 | 93.7 | Traces |
| Example XI | $C_2H_4$ / \  N—$C_2H_4$—N  \ / $C_2H_4$ | 2 | 17.7 | 82.3 | Traces |

The reaction conditions for the isomerization of 5-vinylnorbornene-2 are as follows:

| | |
|---|---|
| 5-vinylnorbornene-2 | 0.2 mol |
| Benzyl sodium | 2 millimols |
| Toluene | 12 milliliters |
| Temperature | 150° C |
| Time | 1 hour |

The above tabulated data obtained in these examples show that benzyl sodium forms a complex with tetraethylethylene triamine and triethylene diamine, respectively. These complexes have been found highly active in the isomerization reaction according to the invention.

EXAMPLES XII – XIV

These examples are directed to the use of various kinds of organic alkalimetal compounds for combination with the complexing agents according to the invention.

Into a nitrogen-purged 100 milliliter stainless-steel autoclave were charged 0.2 mol 5-vinylnorbornene-2, 2 millimols tetramethylethylene diamine and 12 milliliters n-heptane having dissolved therein 2 milimols of each of the various organic alkalimetal compounds shown in Table 4.

The reaction was continued for three hours at 50° C. The gas-chromatographic data of the reaction products are given in the following Table.

TABLE 4

| | Organic Alkali metal | Tetramethyl-ethylene Diamine | Yield of 5-ethylidene-norbornene-2 (%) |
|---|---|---|---|
| Compar. Example VI | Butyl | not added | 13.8 |
| Example XII | sodium | added | 69.5 |
| Compar. Example VII | Allyl | not added | 9.9 |
| Example XIII | sodium | added | 65.8 |
| Compar. Example VIII | Phenyl potas- | not added | 18.3 |
| Example XIV | sium | added | 89.5 |

Thus, it will be noted that the complexes which result from the combination of tetramethylethylene diamine with the above various organic alkalimetal compounds are very active catalysts in the preparation of 5-ethylidene-norbornene-2 from 5-vinylnorbornene-2.

EXAMPLE XV

The process of Example II was followed except that 0.25 mol 5-propenylnorbornene-2 was used instead of 5-vinylnorbornene-2. There was obtained 88.3 percent of 5-propylidenenorbornene-2. This example indicates that the complex of benzyl sodium and tetramethylethylene diamine can be applied with excellent results also to the isomerization of 5-propenylnorbornene-2.

EXAMPLE XVI

This example is given in respect of the re-arrangement of 5-vinylnorbornene-2, using normal butyl lithium as combined with dimethylpiperazine as a catalyst.

Into a nitrogen-purged 100 milliliter stainless-steel autoclave were charged 0.2 mol 5-vinylnorbornene-2, 300 milliliters heptane solution having 2 millimols normal butyl lithium and 4 millimols dimethylpiperazine. The reaction was continued for ten hours at 50° C. The reaction product was analyzed by gas chromatography thereby revealing a yield of 68.1 percent of 5-ethylidene-norbornene-2.

What is claimed is:

1. A process for the preparation of 5-alkylidene-norbornene-2 comprising isomerizing 5-alkenylnorbornene-2 in the presence of a catalyst consisting of an organic alkalimetal compound and a complexing agent combined therewith, said complexing agent being selected from the group consisting of
   a. a substituted polymethylene diamine of the formula:

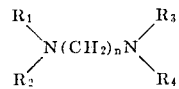

where $n$ is an integer of two or greater, and $R_1$, $R_2$, $R_3$ and $R_4$ are an alkyl, cycloalkyl or aryl radical;
   b. a substituted polyethylene diamine of the formula:

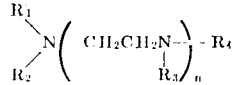

where $n$ is an integer of two or greater, and $R_1$, $R_2$, $R_3$ and $R_4$ are an alkyl, cycloalkyl or aryl radical; and (c) triethylene diamine.

2. The process as claimed in claim 1 wherein said organic alkalimetal compound is of the general formula:

where R is an alkyl, alkenyl, cycloalkyl, aryl or arylalkyl radical, and Me is lithium, sodium or potassium.

3. The process as claimed in claim 1 wherein said complexing agent is used in an amount of 0.1 to 5 mols per mol of said organic alkalimetal compound.

4. The process as claimed in claim 1 wherein the isomerization reaction is carried out at temperatures ranging between 0° and 200° C.

5. The process as claimed in claim 1 wherein said 5-alkenylnorbornene-2 is selected from the group consisting of 5-vinylnorbornene-2 and 5-propenylnorbornene-2.

6. The process as claimed in claim 2 wherein said organic alkalimetal compound is selected from the group consisting of benzyl sodium, allyl sodium, methyl sodium and phenyl potassium.

7. The process as claimed in claim 1 wherein said substituted polymethylene diamine is selected from the group consisting of tetramethylethylene diamine, tetraethyl-ethylene diamine, tetramethylpropylene diamine and dimethylpiperazine.

8. The process as claimed in claim 1 wherein said substituted polyethylene diamine is pentamethyl triamine.

* * * * *